(12) United States Patent
Mahy et al.

(10) Patent No.: US 8,270,028 B2
(45) Date of Patent: Sep. 18, 2012

(54) METHOD FOR CREATING A COLOR LINK

(75) Inventors: Marc Mahy, Wilsele (BE); Wim Cliquet, Tremelo (BE); Stefan Livens, Wijnegem (BE)

(73) Assignee: Agfa Graphics NV, Mortsel (BE)

( * ) Notice: Subject to any disclaimer, the term of this patent is extended or adjusted under 35 U.S.C. 154(b) by 767 days.

(21) Appl. No.: 11/904,440

(22) Filed: Sep. 27, 2007

(65) Prior Publication Data
US 2009/0086223 A1 Apr. 2, 2009

(51) Int. Cl.
*G06F 15/00* (2006.01)
(52) U.S. Cl. .......... 358/1.9; 358/504; 358/518; 382/167
(58) Field of Classification Search ............ None
See application file for complete search history.

(56) References Cited

U.S. PATENT DOCUMENTS

| | | | | |
|---|---|---|---|---|
| 4,551,751 A * | 11/1985 | Jung | | 358/500 |
| 5,745,120 A * | 4/1998 | De Baer et al. | | 345/590 |
| 5,880,744 A * | 3/1999 | Bradstreet | | 345/530 |
| 6,039,434 A * | 3/2000 | Moroney | | 347/43 |
| 6,205,246 B1 * | 3/2001 | Usami | | 382/167 |
| 6,646,763 B1 * | 11/2003 | Estrada | | 358/1.9 |
| 6,705,703 B2 * | 3/2004 | Zeng et al. | | 347/43 |
| 6,870,636 B2 * | 3/2005 | Kulkarni | | 358/1.9 |
| 6,919,975 B1 * | 7/2005 | Haikin et al. | | 358/518 |
| 7,126,718 B1 * | 10/2006 | Newman et al. | | 358/1.9 |
| 7,196,817 B2 * | 3/2007 | Couwenhoven et al. | | 358/1.9 |
| 7,246,869 B2 * | 7/2007 | Tanaka et al. | | 347/16 |
| 7,356,181 B2 * | 4/2008 | Haikin et al. | | 382/167 |
| 7,369,274 B2 * | 5/2008 | Chang | | 358/1.9 |
| 7,397,582 B2 * | 7/2008 | Tin | | 358/2.1 |
| 7,428,332 B2 * | 9/2008 | Spaulding et al. | | 382/167 |
| 7,535,596 B2 * | 5/2009 | Spaulding et al. | | 358/1.9 |
| 7,742,058 B2 * | 6/2010 | Mahy et al. | | 345/590 |
| 7,961,354 B2 * | 6/2011 | Eguchi | | 358/2.1 |
| 2003/0234946 A1 * | 12/2003 | Saito | | 358/1.9 |
| 2004/0150847 A1 * | 8/2004 | Mahy | | 358/1.9 |
| 2005/0094171 A1 * | 5/2005 | Ogasahara | | 358/1.9 |
| 2005/0105136 A1 * | 5/2005 | Jung | | 358/3.1 |
| 2005/0195420 A1 * | 9/2005 | Gerrits | | 358/1.13 |
| 2008/0100887 A1 * | 5/2008 | Hayase | | 358/504 |
| 2009/0190180 A1 * | 7/2009 | Verbeeck et al. | | 358/3.23 |

* cited by examiner

*Primary Examiner* — Dung Tran
(74) *Attorney, Agent, or Firm* — Keating & Bennett, LLP

(57) ABSTRACT

The invention deals with a method for replacing the colorant values of a raster image by a new set of colorant values that is for example optimized for a standardized printing process. According to the invention, a forward look up table is identified that transforms the colorant values in the raster image into color values. The color values in this look up table are separated into new colorant values to obtain a colorant to colorant interpolation look up table. This is done by using an inverse transformation that is based on the forward look up table using appropriate separation parameters for the standardized printing process. The method has the advantage that it enables to map pure colorant values in the original image back onto pure colorant values in the transformed image.

16 Claims, 1 Drawing Sheet

METHOD FOR CREATING A COLOR LINK

TECHNICAL FIELD

The invention deals with the reproduction of color images by means of printing techniques.

More specifically the invention deals with a color management technique.

Even more specifically, the invention deals with an advanced color management technique, that is a color management technique in which a specific color transformation is calculated for an object just before that object is transformed by said transformation.

BACKGROUND OF THE INVENTION

1. General Background

The reproduction of color images on printing systems such as inkjet printers, toner based printing systems or offset presses relies on subtractive mixing of variable amounts of colorants. A typical set of colorants comprises cyan (C), magenta (M), yellow (Y) and black (K) colorants. In specific applications, such as the in the packaging industry, colorants may include other inks such as orange (O), green (G) or blue (B) inks, or inks having a different color.

The cost of colorants represents a considerable part of the total cost in print production. There is hence an economical incentive to reduce the cost of colorants by reducing colorant consumption.

Colorant consumption can be managed when an image is separated from color values into corresponding colorant values.

A typical prior art pre-press workflow uses Adobe Photoshop™. An original image is available from a photo scanner or a digital camera and represents an image represented in color vector space such sRGB or CIELab. In Photoshop, the image is separated and stored into a colorant vector space, for example a colorant space that corresponds with variable amounts of cyan, magenta, yellow and black inks on a press that meets the SWOP printing standard. For this purpose, Photoshop has access to a printer profile that characterizes such a printer. Usually a printer profile is described in an ICC (International Color Consortium) compliant format. Such a printer profile includes at least a "forward look up table" that tabulates the colors that result from printing a number of samples in the colorant vector space. The contents of the table are populated by printing and measuring a printer characterization target. Interpolation techniques are used to predict the color vector of a colorant vector that is not in the forward table.

For the purpose of converting a color vector into a colorant vector, an inverse table is used. This inverse table is usually populated by modeling the information in the forward table, and mathematically inverting this forward printer model. The inverse table can be included in a printer profile, or it can be calculated by a color management system from the forward table. The inverse table is used in combination with interpolation for the purpose of transforming a color vector into a colorant vector.

A user can impose certain additional parameters on the model inversion. A first restriction involves the selection of a rendering intent. A user can typically select between a calorimetric rendering and a perceptual rendering intent. In the first case, color vectors are converted into colorant vectors in a way that the printed color when measured, accurately corresponds with the original color vector. In the second case, an additional color distortion is permitted that takes into effect that the reproducible color gamut of a printer is usually different than the range of colors in an original image. The color distortion in perceptual rendering is such that it emphasizes preserving color differences, rather than that it aims to preserve the color itself.

Another set of additional parameters deals with setting the maximum value for the sum of the colorant values and the GCR (grey component replacement) settings.

Information on this and related subjects is found on the website of the International Color Committee (ICC).

2. The Problem when Documents have Different Origins

A problem originates when in a prepress organization a plurality of documents have to be processed in a workflow, wherein said documents have different origins.

Since the documents are already separated in colorants, but have different origins, there is absolutely no guarantee that the colorant set and the additional restrictions used for the model inversion are the same for all documents.

For a example, a first document may have been separated for a SWOP colorant set, using a GCR setting of 20% and a maximum for the sum of the colorant values equal to 340%, while a second document may have been separated using a GCR level of 70% and a maximum for the sum of the colorant values equal to 280%.

These different settings create an undesirable situation as they implicate that a printer has to set up his press for two different printing conditions to print both documents.

The situation is potentially even more complicated if two document objects are supplied that have been separated for different printing conditions but that are to be printed using the same print masters. In that case it is impossible to print both objects using the optimal press set-up. The optimal press set up in that case always involves making a compromise.

A first problem that hence needs to be resolved is to transform the colorant vectors in multiple document objects towards the same standardized printing process.

Since in general a considerable amount of colorant can be saved by increasing a level of GCR, a second problem that needs to be resolved is to transform the colorant vectors in multiple document objects in such a way that the total amount of colorant that is consumed during printing is reduced.

3. Prior Art Solutions

A prior art solution for resolving the above problems consists of making a color link by means of a color management system for transforming the original colorant vectors of an object into colorant vectors for the standardized printing process.

Such a link typically consists of a look up table which can be used in combination with an interpolation technique for transforming the colorant vectors of a raster image.

Making a link according to a prior art method involves the following steps:

First a forward look up table is identified having colorant vectors as entries and color vectors as data points.

Next the color vectors in the forward look up table are replaced by corresponding colorant vectors for the standardized printing process. For this purpose, a prior art technique uses an inverse look up table—having color vectors as entries and colorant vectors for the standardized printing process as data points—in combination with interpolation.

A first disadvantage of this prior art method is that it introduces interpolation error. This is particularly noticeable for the pure colorants, such as for example pure yellow, cyan or magenta. The conversion of these pure colorants from colorant to color vectors using the forward look up table may be fairly accurate because the pure colors correspond with sampling points of the forward interpolation table. The resulting color vectors, however, do generally not correspond with sampling points of the inverse look up table. This generally implies that the transformation from color vector to colorant vectors of the standardized printing process will introduce interpolation error for the colors that correspond with the pure colorants.

The net result is that, for example, a pure yellow colorant—after the forward and inverse transformations—will appear contaminated with cyan and magenta colorants. This may be unacceptable.

SUMMARY OF THE INVENTION

A solution for the above mentioned problems is realized by using a method and a product according to the independent and variously dependent claims of the current application.

Specifically, according to the current application, an input object has a first colorant vector that is to be transformed into a second colorant vector. The first colorant vector is an original colorant vector of the object. The second colorant vector is for example optimized for a standardized printing process. It can also be optimized for reducing the total amount of colorant, or for changing the grey component. The object is typically a raster image but it can also be a page description object such as a line or a polygon.

The transformation is realized by means of a link look up table in combination with interpolation. This link look up table has original colorant vectors as entries and transformed colorant vectors as data points.

The data points of the link look up table are obtained by first identifying for the object a forward look up table having colorant vectors as input and color vectors as data points. The entries of the forward and link look up tables are preferably the same.

The link look table in combination with an interpolation technique defines a forward model that predicts the color of a printed colorant vector.

The data points of the link look up table are obtained by separating the colors of the corresponding entries in the forward table using an inverse of the forward model. Inverting a forward model preferably involves also defining GCR settings and a maximum level of the sum of the colorants and the maximum level of one or more individual colorants.

Once the link is available, it can be used in combination with an interpolation technique to transform all the colorant vectors of the object.

The forward look up table can be embedded in a color profile that is associated with the object. Alternatively, if no color profile is available, a color profile can be associated with an object by analyzing the colorant vectors in the object and comparing these vectors with data points of inverse tables of a set of standard color profiles. An inverse table is a table that has color vectors as entries and colorant vectors as data points.

The link preferably preserves color and color gamut, but reduces the consumption and cost of the colorants for printing said object.

The link preferably also preserves the pure colorants and the combinations of the pure colorants, that is pure colorants and their combinations are mapped onto pure colorants and their combinations.

Optionally the gradation of the colorant values in the link is changed, for example to accommodate for an adjustment of the dot gain compensation.

The invention also comprises a system and a data carrier comprising software to perform the above methods.

The invention eliminates the interpolation error in prior art techniques by eliminating the need for using an interpolation in an inverse table to create a link. Because the forward look up table itself is used as the basis for the model inversion to create the link, exact mapping of the pure colorants is easily achieved.

The method is also very useful in the context of an advanced color management system, since all the operations for calculating the link can be done at the time the object is processed.

DETAILED DESCRIPTION OF THE PREFERRED EMBODIMENTS

Colorant

Figure 1:
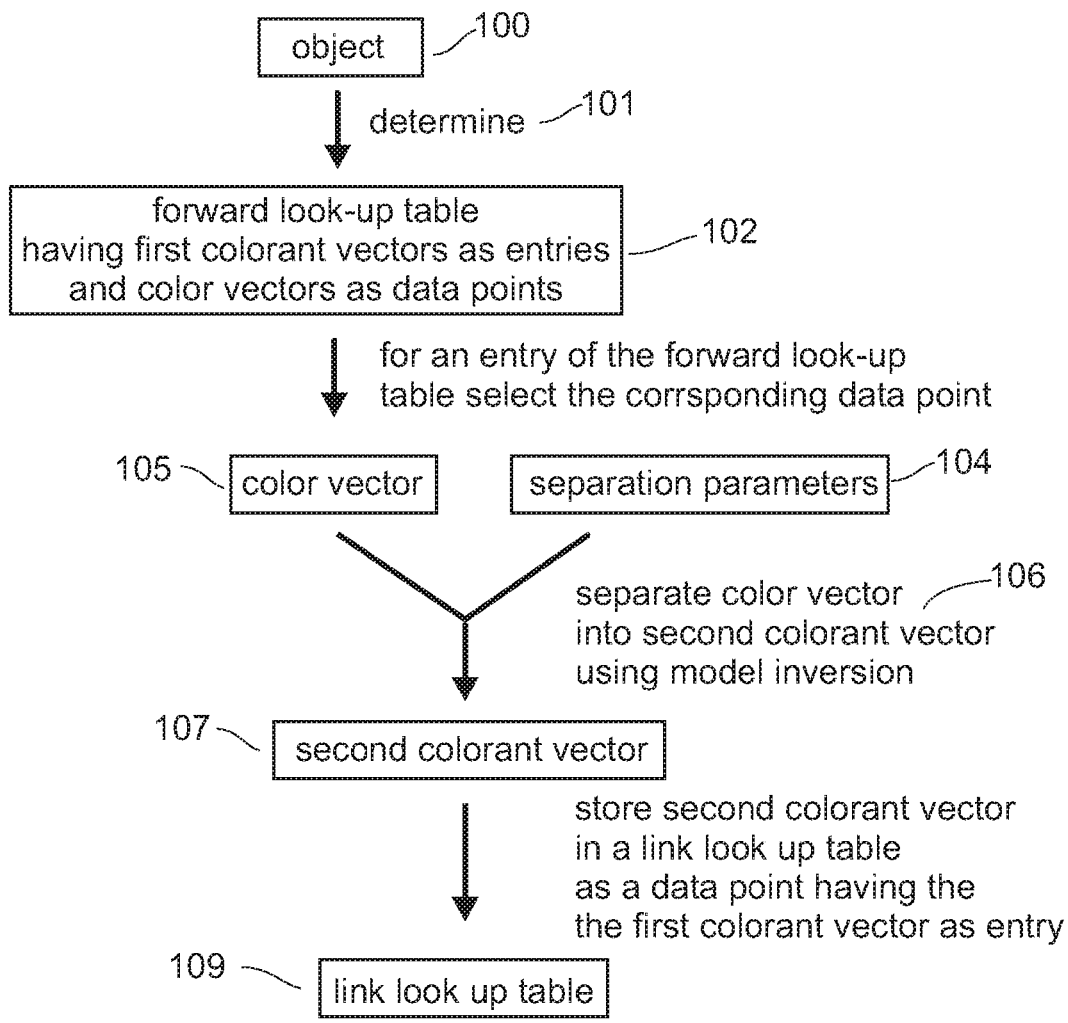
FIG. 1 shows a flowchart with the steps for calculating a link look up table according to a preferred embodiment of the current invention.
Figure 2:
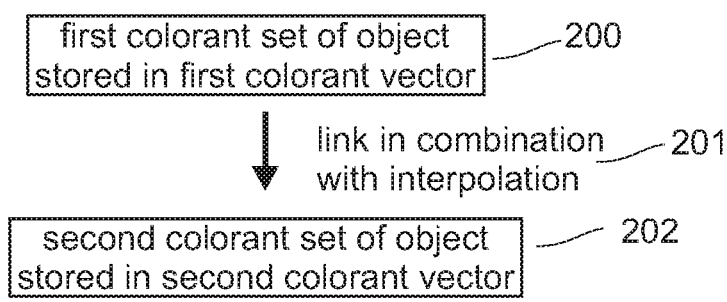
FIG. 2 shows a flowchart for transforming a first set of amounts of colorants of an object that is to be printed into a second set of amounts of inks using a link look up table.

A colorant is any substance absorbs or emits visible radiation. Examples include cyan (C), magenta (M), yellow (Y) or black (K) inks. Other examples include orange (O), green (G) or blue (B) inks.

The amount of absorption or radiation of a colorant is represented by a colorant amount having a value. If the colorants are inks in a printing process, the colorant amounts are usually represented on a scale from 0.0 and 1.0, whereby 0.0 corresponds with no colorant on the printed substrate and 1.0 corresponds with full coverage of the substrate by the colorants. The values between 0.0 and 1.0 are realized by means of a halftoning or by means of a density modulation technique.

Object, Document

An object can be a graphic object such as a polygon or a line; a text object or a raster image. A document can comprise a single object or multiple objects such as multiple graphics, multiple text and multiple raster images.

A document can be represented in an OpenOffice™, MS-Word™, Quark Xpress™, Adobe InDesign™ or any other similar document format.

A document can also be in a format that is specifically designed for raster images such as the Adobe PhotoShop™, Corel PhotoPaint™, JPEG, TIFF, PNG or a similar image format.

According to the current invention, a document is preferably represented in a page description language format such as PostScript™ or PDF™.

Method According to a Preferred Embodiment

First Step: Determining a Forward Look Up Table

A first step of a preferred embodiment comprises determining 101 a forward look up table 102 that has colorant vectors related to the object 100 as entries and the corresponding color vectors as data points. Such a forward look up table 102 is for example found in an ICC color profile that is associated with the object 100. The look up table 102 in such a profile is based on measuring a characterization target of a color reproduction device for rendering the object 100.

Preferably the color vectors 105 in the forward look up table are represented in a profile connection space such as CIELab.

The determining step 101 is preferably automatic, i.e. requiring no user interaction by the user. This is for example achieved by using standard parsing or interpretation techniques, such as used during the interpretation of page description languages.

In cases that a color profile is not explicitly available, it is often still possible to estimate what color profile is associated with the object, for example by assuming that one of a set of industry standard color profiles was used to separate the image.

A method for this purpose has been extensively described in the U.S. application Ser. No. 11/657,317, filed on 2007 Jan. 24, having the same inventor and assigned to the same applicant as the current application. According to this method, an aggregate distance is evaluated between colorant vectors of an object 100 and the data points in an inverse look up table of an industry standard color profile. If these distances are zero or small, there is a great likelihood that this industry standard profile was the one that was used to separate the object color vectors into colorant vectors. In that case the forward look up table 102 that corresponds with the inverse table is selected.

If the above steps are repeated on a set of inverse tables, the forward look up table 102 can be selected that yields the minimum aggregate distance.

Second Step: Calculating Link

A link is a look up table 109 that in combination with an interpolation technique 201 can be used for transforming original colorant vectors 200 of an object into transformed colorant vectors 202.

Both the entries and the data points of such a look up table are hence colorant vectors.

In a representative case the colorant vectors are (c,m,y,k) vectors of a CMYK printing process.

The entries of the link are preferably the same as the entries of the forward look up table 102. Optionally they are a subset of the entries of the forward look up table.

The data points of the link are obtained by separating 106 the color vectors 105 in the forward look up table 102 into colorant vectors 107.

According to a preferred embodiment this is explicitly not done by interpolating in an inverse look up table, but by inverting a forward model 106 that is based on the previously identified forward look up table.

Separating 106 a color into colorants usually involves defining separation parameters 104 such as GCR settings, a value for the maximum sum of the colorant amounts and dot gain compensation and a maximum value for the individual colorants.

According to a preferred embodiment the GCR settings are selected in such a way that applying the link on an object increases the use of non-chromatic (k) colorant and reduces the use of chromatic (c,m,y) colorants.

Also according to a preferred embodiment, the maximum sum of the colorant values is selected so that applying the link on an object results in a reduction of this parameter.

Preferably the separation parameters are optimized for a specific rendering process, such as for example an offset press with specific settings and characteristics.

Applying the link 201 on objects that were previously separated has the effect that they are all re-separated with the same settings. If these settings are optimized for a specific rendering process, this results in reduced press set up time and a constant high image quality level.

The actual inversion of the forward model 106 is for example carried out using a method and apparatus as disclosed in U.S. Pat. No. 5,878,195 filed on 1996 Sep. 3, having the same inventor and being assigned to the same applicant as the current application.

The third step according to the invention has the effect that the data points of the link are not subject to interpolation error.

For example, a forward look up table 102 has an entry corresponding with a first colorant vector. The data point of the forward look up table is a color vector 105. This color vector describes exactly the color of the first colorant vector 102 when printed by printing process. This color vector can be re-separated into a second colorant vector 107 by inverting 106 the forward model in combination with separation parameters. This re-separation step requires only one data point in the forward look up table (specifically the data point corresponding with the first colorant vector as entry) and hence does not introduce interpolation error. This results in an advantage over a prior art method that uses interpolation in an inverse look up table for re-separating the color vector into a second colorant vector.

Avoiding interpolation error is especially advantageous when a first colorant vector contains only one or two chromatic colorants, such as for example only amounts of yellow and cyan. In that case it is desirable that after converting the first colorant vector into a second colorant vector, that the second colorant vector is not "contaminated" by colorants of which the value was zero in the first colorant vector.

Optionally, the results obtained by inverting the forward model can be partially overruled. For example the data points corresponding to pure colorants entries can be edited so that they contain pure colorants. For example, a data point of an entry c=0.8, m=y=k=0.0 can be set to c'=0.8, m'=y'=k'=0.0.

Third Step: Using the Link in Combination with Interpolation 201

The third step involves using the link in combination with an interpolation technique 201 to transform first colorant sets 200 stored in first vectors of an object into second colorant sets 202 stored in second colorant vectors.

Preferably an interpolation technique is used which is often referred to as "tetrahedral interpolation".

In the case of a CMYK printing process the link has four-dimensional entries (c,m,y,k) and four-dimensional data points (c',m',y',k').

The entries of said look-up table correspond with the combinations of:

c[r] wherein r≧0, r≦rmax−1;
m[s] wherein s≧0, s≦smax−1;
y[t] wherein t≧0, t≦tmax−1;
k[u] wherein u≧0, u≦umax−1;
wherein r, s, t, u are integers and wherein rmax, smax tmax and umax correspond with the number of sampling points in each dimension.

A tetrahedral interpolation of a colorant vector (c,m,y,k) in a first colorant vector space comprises the following steps:

In a first step a four-dimensional cube ([r;r+1], [s;s+1], [t;t+1], [u;u+1]) is determined having vertices that enclose the colorant vector (c,m,y,k).

This is done by determining the indices (r,s,t,u) for which the following relations hold:

$$c[r] \leq c \leq c[r+1];$$

$$m[s] \leq m \leq m[s+1];$$

$$y[t] \leq y \leq y[t+1];$$

$$k[u] \leq k \leq k[u+1];$$

For the purpose of convenience, the following shorthand notation is introduced to refer to the vertices of the four-dimensional cube:

```
0000 =    (c[r], m[s], y[t], k[u])
0001 =    (c[r], m[s], y[t], k[u + 1])
0010 =    (c[r], m[s], y[t + 1], k[u])
0011 =    (c[r], m[s], y[t + 1], k[u + 1])
0100 =    (c[r], m[s + 1], y[t], k[u])
0101 =    (c[r], m[s + 1], y[t], k[u + 1])
0110 =    (c[r], m[s + 1], y[t + 1], k[u])
0111 =    (c[r], m[s + 1], y[t + 1], k[u + 1])
1000 =    (c[r + 1], m[s], y[t], k[u])
1001 =    (c[r + 1], m[s], y[t], k[u + 1])
1010 =    (c[r + 1], m[s], y[t + 1], k[u])
1011 =    (c[r + 1], m[s], y[t + 1], k[u + 1])
1100 =    (c[r + 1], m[s + 1], y[t], k[u])
1101 =    (c[r + 1], m[s + 1], y[t], k[u + 1])
1110 =    (c[r + 1], m[s + 1], y[t + 1], k[u])
1111 =    (c[r + 1], m[s + 1], y[t + 1], k[u + 1])
```

The following shorthand notations are also introduced:

$\Delta c = c - c[r]$;

$\Delta m = m - m[s]$;

$\Delta y = y - y[t]$;

$\Delta k = k - k[u]$;

The four dimensional cube ([r;r+1], [s;s+1], [t;t+1], [u;u+1]) can be divided by six diagonal hyperplanes that share a diagonal line between the points 0000 and 1111. The equations of these six planes are:

$\Delta c = \Delta m$;

$\Delta c = \Delta y$;

$\Delta c = \Delta k$;

$\Delta m = \Delta y$;

$\Delta m = \Delta k$;

$\Delta y = \Delta k$;

Each of the six planes subdivides the cube into two half cubes. The six planes together divide the cube into 24 tetrahedrons having five vertices $v_0$, $v_1$, $v_2$, $v_3$, $v_4$ as represented in Table 1.

TABLE 1

| # | condition | v0 | v1 | v2 | v3 | v4 |
|---|---|---|---|---|---|---|
| 1 | $\Delta k \geq \Delta y \geq \Delta m \geq \Delta c$ | 0000 | 0001 | 0011 | 0111 | 1111 |
| 2 | $\Delta k \geq \Delta y \geq \Delta c \geq \Delta m$ | 0000 | 0001 | 0011 | 1011 | 1111 |
| 3 | $\Delta k \geq \Delta m \geq \Delta y \geq \Delta c$ | 0000 | 0001 | 0101 | 0111 | 1111 |
| 4 | $\Delta k \geq \Delta m \geq \Delta c \geq \Delta y$ | 0000 | 0001 | 0101 | 1101 | 1111 |
| 5 | $\Delta k \geq \Delta c \geq \Delta y \geq \Delta m$ | 0000 | 0001 | 1001 | 1011 | 1111 |
| 6 | $\Delta k \geq \Delta c \geq \Delta m \geq \Delta y$ | 0000 | 0001 | 1001 | 1101 | 1111 |
| 7 | $\Delta y \geq \Delta k \geq \Delta m \geq \Delta c$ | 0000 | 0010 | 0011 | 0111 | 1111 |
| 8 | $\Delta y \geq \Delta k \geq \Delta c \geq \Delta m$ | 0000 | 0010 | 0011 | 1011 | 1111 |
| 9 | $\Delta y \geq \Delta m \geq \Delta k \geq \Delta c$ | 0000 | 0010 | 0110 | 0111 | 1111 |
| 10 | $\Delta y \geq \Delta m \geq \Delta c \geq \Delta k$ | 0000 | 0010 | 0110 | 1110 | 1111 |
| 11 | $\Delta y \geq \Delta c \geq \Delta k \geq \Delta m$ | 0000 | 0010 | 1010 | 1011 | 1111 |
| 12 | $\Delta y \geq \Delta c \geq \Delta m \geq \Delta k$ | 0000 | 0010 | 1010 | 1110 | 1111 |
| 13 | $\Delta m \geq \Delta k \geq \Delta y \geq \Delta c$ | 0000 | 0100 | 0101 | 0111 | 1111 |
| 14 | $\Delta m \geq \Delta k \geq \Delta c \geq \Delta y$ | 0000 | 0100 | 0101 | 1101 | 1111 |
| 15 | $\Delta m \geq \Delta y \geq \Delta k \geq \Delta c$ | 0000 | 0100 | 0110 | 0111 | 1111 |
| 16 | $\Delta m \geq \Delta y \geq \Delta c \geq \Delta k$ | 0000 | 0100 | 0110 | 1110 | 1111 |
| 17 | $\Delta m \geq \Delta c \geq \Delta k \geq \Delta y$ | 0000 | 0100 | 1100 | 1101 | 1111 |
| 18 | $\Delta m \geq \Delta c \geq \Delta y \geq \Delta k$ | 0000 | 0100 | 1100 | 1110 | 1111 |
| 19 | $\Delta c \geq \Delta k \geq \Delta y \geq \Delta m$ | 0000 | 1000 | 1001 | 1011 | 1111 |
| 20 | $\Delta c \geq \Delta k \geq \Delta m \geq \Delta y$ | 0000 | 1000 | 1001 | 1101 | 1111 |
| 21 | $\Delta c \geq \Delta y \geq \Delta k \geq \Delta m$ | 0000 | 1000 | 1010 | 1011 | 1111 |
| 22 | $\Delta c \geq \Delta y \geq \Delta m \geq \Delta k$ | 0000 | 1000 | 1010 | 1110 | 1111 |
| 23 | $\Delta c \geq \Delta m \geq \Delta k \geq \Delta y$ | 0000 | 1000 | 1100 | 1101 | 1111 |
| 24 | $\Delta c \geq \Delta m \geq \Delta y \geq \Delta k$ | 0000 | 1000 | 1100 | 1110 | 1111 |

The 24 tetrahedrons correspond with the 4!=24 possible permutations of ordering four colorants.

A set of vertices $v_i$ (i=0, 1, 2, 3, 4) in Table 1 always includes the points 0000 and 1111 as beginning and end points. The "intermediate" vertices are obtained by switching one by one the remaining dimensions from 0 to 1 in one of the 24 available orders.

In a next step a tetrahedron in said cube is determined to which the colorant vector (c,m,y,k) belongs.

This is achieved by ordering the colorants $\Delta c$, $\Delta m$, $\Delta y$ and $\Delta k$ from large to small (for example using the "quick sort" algorithm) and identifying by means of the above table the five vertices $(v_0, v_1, v_2, v_3, v_4)$ of the tetrahedron to which the colorant vector (c,m,y,k) belongs. With every vertex $v_i$ belongs a data point $(c'_i, m'_i, y'_i, k'_i)$.

For an arbitrary colorant vector (c,m,y,k) that is used as entry for the interpolation, the interpolating weights w1, w2, w3 and w4 are defined as:

$w1 = (c - c[r])/(c[r+1] - c[r])$;

$w2 = (m - m[s])/(m[s+1] - m[s])$;

$w3 = (y - y[t])/(y[t+1] - y[t])$;

$w4 = (k - k[u])/(k[u+1] - k[u])$;

Using these weights the actual interpolation formula for finding an interpolated colorant vector (c',m',y',k') are:

$c' = c'_0 w1*(c'_1 - c'_0) + w2*(c'_2 - c'_1) + w3*(c'_3 - c'_2) + w4*(c'_4 - c'_3)$;

$m' = m'_0 w1*(m'_1 - m'_0) + w2*(m'_2 - m'_1) + w3*(m'_3 - m'_2) + w4*(m'_4 - m'_3)$;

$y' = y'_0 w1*(y'_1 - y'_0) + w2*(y'_2 - y'_1) + w3*(y'_3 - y'_2) + w4*(y'_4 - y'_3)$;

$k' = k'_0 w1*(k'_1 - k'_0) + w2*(k'_2 - k'_1) + w3*(k'_3 - k'_2) + w4*(k'_4 - k'_3)$;

A graphical interpretation of this formula is that a piecewise linear interpolation takes place along a sequence of the line segments defined by the vertices $v_0$ to $v_4$.

The above interpolation technique is easily generalized by a person skilled in the art for a transformation from a first N-dimensional colorant vector $V(a_0, a_1, \ldots a_{N-1})$ space to a second M-dimensional vector $V(b_0, b_1, \ldots b_{M-1})$ space.

In summary the steps in a general case are:

determine for a colorant vector $V(a_0, a_1, \ldots a_{N-1})$ to which N-dimensional cube in the N-dimensional colorant vector space it belongs by comparing the vector component values with the entries of the N-dimensional look up table;

determine to which one of the N! N-dimensional tetrahedrons in the cube the colorant vector $V(a_0, a_1, \ldots a_{N-1})$ belongs, by ordering the components $a_0, a_1, \ldots a_{N-1}$;

do a piecewise linear interpolation along the along the edges defined by the vertices of said tetrahedron to obtain the M components $b_0, b_1, \ldots b_{M-1}$ of the second colorant vector $V(b_0, b_1, \ldots b_{M-1})$

Other Preferred Embodiments

Cost of Colorants

As mentioned before, the separation process in a second step according to a preferred embodiment of the current invention uses a parameter to control the maximum sum of the amounts of colorants in said second vector space. For example, a maximum amount of 280% can be selected for four colorants. According to the same embodiment, a specific GCR setting is used.

Because the prices of different colorants are not necessarily the same, an alternative embodiment consists of selecting a separation parameter that minimizes the cost of colorant.

Provided that a first colorant c has a price Pc, a second colorant m a price Pm, a third colorant a price Py and the third colorant a price Pk, the price P1 to reproduce a color using a first colorant vector (c,m,y,k) is $$P1 = c*P_c + m*P_m + y*P_y + k*P_k$$

After transforming the first colorant vector into a second colorant vector (c',m',y',k') by a second transformation, the price P2 to reproduce the color is $$P2 = c'*P_c + m'*P_m + y'*P_y + k'*P_k$$

According to an alternative embodiment, the second transformation from a first to a second colorant vector space is defined so that $P2 \leq P1$.

This effect is for example obtained by selecting in a second step of the preferred embodiment GCR setting that minimizes the cost P2 for each transformed first colorant vector.

Stability

An alternative approach over minimizing the cost of a set of colorants is to minimize the color variations of the colorants in the presence of small variations of the colorants, for example due to process instability. A method to achieve this goal is for example the subject of the U.S. Pat. No. 5,812,694 filed on 1996 Aub. 30, having the same inventor and assignee as the current application.

Page Description Object

The most common application for using the current invention is when the object is a raster image described using a page description language. In general, such an image object is also associated with a color profile.

It should be clear to a person skilled in the art, however, that the invention can just as well be used for objects that are not raster images, such as text, lines or polygons.

Plurality of Objects

According to one embodiment of the invention, the method in claim 1 is used for a plurality of objects. The objects in that case do not necessarily have to be of the same nature. For example, a first object can be a raster image, a second object a text object, and a third object a graphic object such as a polygon. The invention supports a feature that the separation parameters that are used for the links to transform the different objects can be different. For example, the "maximum black colorant" separation parameter for creating a link that is to transform a raster image can be set to a value of 0.8. This would make no sense if the same link would be used for transforming text objects, since the rendering of text generally requires that it can be rendered with a colorant value of 1.0. In the case an embodiment of the invention supports that different separation parameters and different links be used for raster image objects and text objects.

Special Ink Sets

The preferred embodiment has been mainly explained for the case of a CMYK printing process. However, the invention can just as well be used for the CMYKO, CMYKG, or CMYKB, CMYKOG, CMYKOB, CMYKGB or CMYKOGB processes.

According to a special embodiment, the separation parameters can be adjusted so that the link alters the number of colorants of an object. For example, separation parameters can be controlled in a way that objects defined for a CMYKOG process are transformed by the link into objects in which the OG inks are set to zero. In that case the transformed object is effectively separated for a CMYK printing process.

The opposite is just as well possible. In that case a CMYK object can be transformed into an object for a CMYKOG printing process, assuming that a forward transformation is available for a CMYKOG process.

In the case that the setting of the separation parameters significantly alters the colorant gamut of the transformed object, a preferred embodiment for determining a link includes a gamut mapping step to accommodate for this different gamut.

System

The current invention is preferably implemented by means of software running on a computer. This computer should comprise code that is capable of performing all the essential steps of the method.

Such a system comprises an analyzer for determining a forward look-up table for a given object. This can be for example a parser or a page description language interpreter.

The system also comprises computer processor and computer program code for building a forward model of forward look up table and for inverting the forward model using a set of separation parameters to obtain a link.

The system may optionally comprise a computer processor and computer program code for analyzing colorant vectors in the original object to find out if these colorant vectors correspond with a specific industry standard color profile.

Furthermore the system comprises an image processor for using said link in combination with interpolation to transform the colorant vectors of an object.

The system preferably also comprises a graphic user interface for inputting parameters to the system to control the method. A graphic user interface enables a user to specify a reference to an object and separation parameters such as GCR settings, a value for the maximum sum of the colorant values and a gradation curve.

The software for performing the methods in the preferred and other embodiments is preferably stored on a data carrier such as CD-ROM, a hard disk a flash memory. The hard disk may be local or it can be a hard disk of a remote server.

The invention claimed is:

1. A method for transforming a colorant vector representing amounts of chromatic and non-chromatic colorants in a first colorant vector space that is defined by chromatic and non-chromatic colorants of an object, the method comprising the steps of:

determining for said object a forward look up table having first colorant vectors in the first colorant vector space as entries and color vectors as data points, said look up table defining a forward transformation by tabulating colors that result from color measuring a number of samples in the first colorant vector space;

calculating, utilizing a computer, a link look up table comprising said first colorant vectors in the first colorant vector space as entries and second colorant vectors in the first colorant vector space as data points;

transforming, utilizing the computer, the colorant vector representing amounts of colorants of the object into a transformed colorant vector representing transformed amounts of colorants by using the link look up table in combination with a tetrahedral interpolation;

wherein said second colorant vectors are obtained by separating the data points of said forward look up table by inverting said forward transformation in the first colorant vector space in combination with separation parameters, the separation parameters increasing the use of the non-chromatic colorants and reducing the use of the chromatic colorants in the transformed colorant vector.

2. A method according to claim 1 wherein a dimensionality of said first and second colorant vectors is greater than a dimensionality of said color vectors.

3. A method according to claim 1 wherein using said forward transformation maps said first and said second colorant vectors on substantially a same color vector.

4. A method according to claim 1 wherein a sum of components of said second vector is smaller than a sum of components of said first vector.

5. A method according to claim 1 wherein a total cost of colorants of said second colorant vector is smaller than a total cost of colorants of said first colorant vector.

6. A method according to claim 1, wherein said object is a raster image.

7. A method according to claim 1, wherein said color vector is a color vector in a profile connection space of a color management system.

8. A method according to claim 1, additionally comprising a step of changing a gradation of at least one component of the colorant vector representing the amounts of colorants.

9. A method for calculating a first link for a first object and a second link for a second object each according to the steps in claim 1, whereby the separation parameters for calculating said first and second links are different.

10. A method according to claim 1, wherein said first colorant vector and said second colorant vector corresponds with one out of the set of {CMYK, CMYKO, CMYKG, CMYLB, CMYKIG, CMYKOB, CMYKGB, CMYKOGB} printing processes.

11. A tangible, non-transitory data carrier comprising computer code for performing, when the computer code is run on a computer, a method for carrying out the steps according to the claim 1.

12. A method for transforming a colorant vector representing amounts of chromatic and non-chromatic colorants of an object, the method comprising the steps of:
   determining for said object a forward look up table having first colorant vectors as entries and color vectors as data points, said look up table defining a forward transformation;
   calculating, utilizing a computer, a link look up table comprising said first colorant vectors as entries and second colorant vectors as data points;
   transforming, utilizing the computer, the colorant vector representing amounts of colorants of the object into a transformed colorant vector representing transformed amounts of colorants by using the link look up table in combination with interpolation;
   wherein said second colorant vectors are obtained by separating the data points of said forward look up table by inverting said forward transformation in combination with separation parameters, the separation parameters increasing the use of the non-chromatic colorants and reducing the use of the chromatic colorants in the transformed colorant vector; and
   an incremental variation of said second colorant vector results in a smaller distance variation of a color vector than the same incremental variation when applied to said first colorant vector, when said forward transformation is used for transforming a colorant vector into a color vector.

13. A method for transforming a colorant vector representing amounts of chromatic and non-chromatic colorants of an object, the method comprising the steps of:
   determining for said object a forward look up table having first colorant vectors as entries and color vectors as data points, said look up table defining a forward transformation;
   calculating, utilizing a computer, a link look up table comprising said first colorant vectors as entries and second colorant vectors as data points;
   transforming, utilizing the computer, the colorant vector representing amounts of colorants of the object into a transformed colorant vector representing transformed amounts of colorants by using the link look up table in combination with interpolation;
   wherein said second colorant vectors are obtained by separating the data points of said forward look up table by inverting said forward transformation in combination with separation parameters, the separation parameters increasing the use of the non-chromatic colorants and reducing the use of the chromatic colorants in the transformed colorant vector;
   wherein said object is a raster image; and
   further comprising the steps of:
   identifying, utilizing the computer, a set of inverse lookup tables, each inverse look up table being associated with a corresponding forward look up table; calculating, utilizing the computer, for each inverse look up table an aggregate distance between the data points of said inverse look up table and colorant vectors of said raster image object; and
   selecting, utilizing the computer, the forward look up table yielding the minimum distance.

14. A method according to claim 13 wherein calculating said inverse transformation that is derived from said forward transformation comprises the steps of:
   specifying, utilizing the computer, separation parameters comprising a GCR setting, a maximum amount for the sum of colorant values and a maximum amount for the individual colorant values; and
   using said separation parameters to derive said inverse transformation from said forward transformation.

15. A system for calculating a link for transforming a colorant vector representing amounts of chromatic and non-chromatic ink of a first colorant vector space that is defined by chromatic and non-chromatic colorants of an object, the system comprising:
   determining means for determining for said object a forward lookup table having first colorant vectors of the first colorant vector space as entries and color vectors as data points, said look up table in combination with a tetrahedral interpolation technique defining a forward transformation; and
   means for calculating a link by separating the data points in the forward transformation using an inversion of the forward transformation in the first colorant vector space in combination with separation parameters, the separation parameters increasing the use of the non-chromatic inks and reducing the use of the chromatic inks in the transformed colorant vector.

16. A system according to claim 15, further comprising an image processor for using said link in combination with interpolation for transforming a colorant vector of said object into a transformed colorant vector.

* * * * *